(12) United States Patent
Rietzler (10) Patent No.: US 9,010,215 B2
(45) Date of Patent: Apr. 21, 2015

(54) SLIDING SLEEVE

(75) Inventor: Andreas Rietzler, Feldkirch (AT)

(73) Assignee: ThyssenKrupp Presta AG, Eschen (LI)

( * ) Notice: Subject to any disclaimer, the term of this patent is extended or adjusted under 35 U.S.C. 154(b) by 871 days.

(21) Appl. No.: 13/122,217

(22) PCT Filed: Sep. 25, 2009

(86) PCT No.: PCT/EP2009/006946
§ 371 (c)(1),
(2), (4) Date: May 11, 2011

(87) PCT Pub. No.: WO2010/037509
PCT Pub. Date: Apr. 8, 2010

(65) Prior Publication Data
US 2011/0219907 A1    Sep. 15, 2011

(30) Foreign Application Priority Data
Oct. 1, 2008   (DE) .......................... 10 2008 049 825

(51) Int. Cl.
*B62D 1/185*     (2006.01)
*B29C 59/04*     (2006.01)
(Continued)

(52) U.S. Cl.
CPC .............. *F16C 29/02* (2013.01); *B29C 59/043* (2013.01); *B62D 1/16* (2013.01); *B62D 1/185* (2013.01);
(Continued)

(58) Field of Classification Search
CPC ........ B62D 1/195; B62D 1/192; B62D 1/185; B62D 1/16; B62D 1/18; F16D 3/06; F16D 2001/103; F16D 3/185; F16D 1/06; F16D 1/072; F16C 29/02; F16C 3/03; F16C 3/035; F16C 33/6648; F16C 33/201; F16C 33/6622; F16C 29/025; F16F 7/123; B05C 17/0207
USPC .......................... 74/493, 495; 280/775, 777; 403/359.1–359.6; 464/16, 162, 8; 184/8, 9; 384/42, 26, 13; 29/81.03, 29/893.32, 527.7; 492/28–30, 38, 37; 72/252.5; 264/293
See application file for complete search history.

(56) References Cited

U.S. PATENT DOCUMENTS 1,882,956 A * 10/1932 Sandler .......................... 384/293
2,239,044 A *  4/1941 Leighton .......................... 72/40
(Continued)

FOREIGN PATENT DOCUMENTS

DE    3223004 A1    1/1983
DE    3815778 A1   11/1989
(Continued)

OTHER PUBLICATIONS

"Mechanical and Metal Trades Handbook"; Verlag Europa Lehrmittel, Haan-Gruiten, 43rd Edition, 2005, p. 99 (with English translation).
(Continued)

*Primary Examiner* — William Kelleher
*Assistant Examiner* — Valentin Craciun
(74) *Attorney, Agent, or Firm* — Panitch Schwarze Belisario & Nadel LLP (57) ABSTRACT

The invention relates to a telescopable steering spindle having an inner spindle and an outer spindle, which are arranged coaxially in relation to one another and have an out-of-round cross section for torque transmission, wherein an intermediate space is provided between the outer spindle and the inner spindle, a sliding sleeve being arranged in the said intermediate space, wherein the sliding sleeve is provided with a surface structuring on at least one surface facing the inner spindle or the outer spindle.

2 Claims, 5 Drawing Sheets

(51) Int. Cl.
  *F16C 29/02*   (2006.01)
  *F16C 33/04*   (2006.01)
  *B62D 1/16*    (2006.01)
  *B62D 1/20*    (2006.01)
  *F16C 3/035*   (2006.01)
  *F16C 33/20*   (2006.01)
  *F16D 3/06*    (2006.01)

(52) U.S. Cl.
  CPC . *B62D 1/20* (2013.01); *F16C 3/035* (2013.01); *F16C 33/20* (2013.01); *F16D 3/06* (2013.01); *F16D 2300/10* (2013.01)

(56) References Cited

U.S. PATENT DOCUMENTS

| | | | | |
|---|---|---|---|---|
| 2,431,430 | A * | 11/1947 | Shaw | 384/285 |
| 2,674,782 | A * | 4/1954 | Surtees | 29/898.056 |
| 3,293,884 | A * | 12/1966 | Grob | 464/162 |
| 3,298,762 | A * | 1/1967 | Peck et al. | 384/125 |
| 3,575,787 | A * | 4/1971 | Pietrocini | 428/335 |
| 3,670,543 | A * | 6/1972 | Bolt et al. | 72/41 |
| 4,033,020 | A * | 7/1977 | Hudgens | 29/898.03 |
| 4,211,122 | A * | 7/1980 | Hess et al. | 74/89.2 |
| 4,481,997 | A * | 11/1984 | Strader | 152/401 |
| 4,572,022 | A | 2/1986 | Mettler | |
| 4,667,530 | A * | 5/1987 | Mettler et al. | 74/493 |
| 5,001,916 | A * | 3/1991 | Schuler et al. | 72/96 |
| 5,025,547 | A * | 6/1991 | Sheu et al. | 29/527.4 |
| 5,383,811 | A | 1/1995 | Campbell et al. | |
| 5,460,574 | A * | 10/1995 | Hobaugh | 464/162 |
| 5,590,565 | A | 1/1997 | Palfenier et al. | |
| 6,095,690 | A * | 8/2000 | Niegel et al. | 384/293 |
| 6,149,526 | A * | 11/2000 | Boersma et al. | 464/89 |
| 6,739,238 | B2 * | 5/2004 | Ushijima et al. | 92/158 |
| 7,267,045 | B2 * | 9/2007 | Leweux et al. | 92/159 |
| 7,559,266 | B2 * | 7/2009 | Kurokawa | 74/492 |
| 7,610,786 | B2 * | 11/2009 | Takashima et al. | 72/102 |
| 8,641,335 | B2 * | 2/2014 | Takashima et al. | 408/147 |
| 2003/0156769 | A1 | 8/2003 | Whang | |
| 2005/0115295 | A1 * | 6/2005 | Pont | 72/252.5 |
| 2006/0213244 | A1 * | 9/2006 | Brissette | 72/46 |
| 2008/0000316 | A1 * | 1/2008 | Kurokawa | 74/493 |
| 2008/0025861 | A1 * | 1/2008 | Okawa et al. | 418/178 |
| 2009/0087126 | A1 * | 4/2009 | Hagan et al. | 384/26 |
| 2011/0219907 | A1 * | 9/2011 | Rietzler | 74/493 |
| 2012/0165106 | A1 * | 6/2012 | Eltner | 464/162 |

FOREIGN PATENT DOCUMENTS

| | | |
|---|---|---|
| DE | 4130688 A1 | 5/1993 |
| EP | 0755843 A1 | 1/1997 |
| EP | 0916564 A1 | 5/1999 |
| EP | 1873038 A2 | 1/2008 |
| WO | WO 0012293 A1 * | 3/2000 |

OTHER PUBLICATIONS

International Preliminary Report on Patentability issued in related International Application No. PCT/EP2009/006946 on Apr. 5, 2011.

* cited by examiner

SLIDING SLEEVE

CROSS REFERENCE TO RELATED APPLICATIONS

This application is a 35 U.S.C. 371 National Stage Application of International Application No. PCT/EP2009/006946, filed Sep. 25, 2009 claiming priority fron German Patent Application No. 102008049825.4-12, filed Oct. 1, 2008, the entire contents of which are incorporated herein by reference in their entirety.

The invention relates to a sliding sleeve for use between two components, which can be telescoped or rotated into one another.

Sliding sleeves are used to reduce friction and/or for clearance compensation, for example between steering column tubes, which can be telescoped and twisted against one another, and between an outer and an inner shaft of a telescopable steering spindle.

Telescopable steering spindles have two coaxial shaft parts which have an out-of-round cross section and which can be moved axially but can transmit a torque. With steering spindles, freedom from backlash is essential during torque transmission, as is also as little friction as possible. In motor vehicles, telescopable steering spindles are inserted between the steering gear and the generally adjustable steering column. They are supposed to compensate slight changes in the distance between the steering gear and the steering column, such as occur, for example, due to dynamic stresses when the vehicle is in operation by twisting of the vehicle body, but also enable movements of the steering gear in a rubber mounting and/or the length of the steering spindle to be adjusted.

In the prior art, it is known from the publication DE 32 23 004 for an outer and an inner shaft to have a correspondingly complementary profile, in order to enable torque transmission with telescoping at the same time. In order to achieve a high degree of freedom from backlash, the outer shaft is correspondingly adapted in profile to the inner shaft using tools. Here, both tubular inner shafts and solid inner shafts are known. U.S. Pat. No. 5,383,811 reveals a plastic element which is inserted between the telescopable shaft sections. EP 0 755 843 B1 also reveals a plastic intermediate piece which, however, cannot transmit a torque. U.S. Pat. No. 5,590,565 discloses a plastic intermediate piece between two telescopable tubes, which is also not suitable for transmitting a torque.

Another relevant instance of the prior art is revealed in EP 0 916 564 B1. Here, a telescopable steering spindle with the interacting shaft parts having an out-of-round profile is presented. A plastic sleeve is provided between the two shaft parts, the plastic sleeve having the purpose of improving the sliding properties in a way which is durable. In particular, the tendency to stick-slip, the so-called stick-slip effect, should be reduced. This effect with small movements due to the difference between stiction and sliding friction causes noise development which is not tolerated in motor vehicle steering systems.

The prior art telescopable steering spindle does not accomplish this satisfactorily in a durable manner.

Sliding bearings with friction-reducing properties, which are not supposed to have the stick-slip effect, are known from two further publications. DE 41 30 688 A1 reveals a friction-reducing coating of a sliding bearing for the piston rod of a shock absorber. This bearing is not provided to transmit torque. US2003/0156769A1 reveals various designs of hydrostatic bearings. The bearing surfaces are provided with slits through which, under pressure, oil can be forced between the opposing friction bearings. These bearings are also not suitable for transmitting torque. Both kinds of bearing are complex to manufacture and the parts which move relative to one another require a high surface quality. Therefore, these bearings are not suitable for bearing telescopable steering spindles.

The closest prior art is presented in the publication EP 1 873 038 A1. Here, a telescopable steering spindle is presented with an out-of-round cross section, with a sliding sleeve between the axially moveable components. The sliding sleeve is provided with circumferential or axially parallel grooves, in which a lubricant can be arranged. The grooves or channels are formed into the surface of the sliding sleeve as a regular, macroscopic structure. This means that in assembly a larger quantity of lubricant must be introduced in a targeted manner into these grooves. Such lubricant repositories are a fundamental problem in motor vehicles because such a lubricant can move under the effect of gravity and the, to some extent, high ambient temperatures in motor vehicles. It can travel to the bottom of the respective channel and ultimately during movement leak out of the sliding sleeve.

Hence, it is the object of the present invention to produce a sliding, sleeve, and in particular a telescopable steering spindle, having sliding properties which are improved in a way which is durable.

This object is achieved by a sliding sleeve having features found in various ones of the accompanying claims.

Due to the fact that at least one area of the inner and/or of the outer surface after manufacture is provided with a surface structure retaining a lubricant by grinding, blasting or by means of a forming process, the surface can retain applied lubricant in the resulting indentations in a way which is durable. Furthermore, because the surface structure retaining the lubricant is formed by broken-up chains of the long-chain polymers of the sliding sleeve, wherein the broken-up chains are produced in the casting skin by means of a rolling operation, small quantities of lubricant are required. In contrast, the remaining supporting surface of the sleeve, compared to a sleeve surface provided with macroscopic recesses, is particularly large.

In the process, the imprinting or roughening can also only be effected from one side, for example from the outside.

Due to the fact that with a steering spindle according to the invention a sliding sleeve is used which is roughened on at least one surface facing a shaft part, in particular provided with indentations or recesses, the sliding sleeve can retain lubricant in this surface structure in a way which is durable, so that the friction is permanently reduced. The sliding sleeve can at the same time be adapted to the profile of the inner spindle by calibration, wherein advantageously the indentations or recesses are produced on the surface during the calibration procedure.

Due to the fact that with the method according to the invention for producing a telescopable steering spindle having an inner spindle and an outer spindle, which are arranged coaxially in relation to one another and have an out-of-round cross section for torque transmission, wherein an intermediate space is provided between the outer spindle and the inner spindle, a sliding sleeve being arranged in the said intermediate space, wherein the sliding sleeve is provided with a surface structuring on at least one surface facing the inner spindle or the outer spindle, wherein the surface structuring is formed by a rolling operation with a roll or roller, a large number of small lubricant repositories is produced, which retain the lubricant in a way which is particularly durable and only a particularly small quantity of lubricant is sufficient to fill them.

At the same time, it can suffice if the roller is provided with a flat surface and the casting skin is locally broken up by the pressure and the accompanying deformation. It can also be advantageous if the roller is provided with an irregular surface structure divided into small sections, the structure elements of which are smaller than 500 μm and in particular on average less than 100 μm. As a result, the casting skin can also be broken up with elastically flexible materials. Furthermore, such a structure is produced with repositories which, although they are irregularly formed and placed, are defined in terms of size.

An exemplary embodiment of the present invention is described below with the aid of the drawing.

Figure 1:
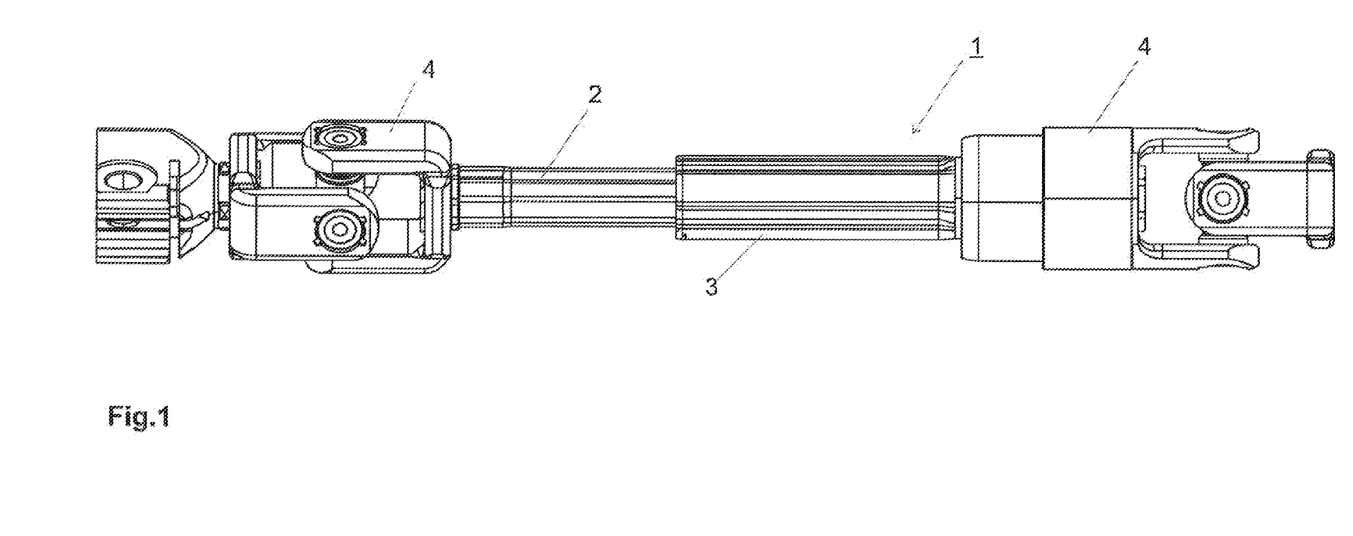
FIG. 1: shows a telescopable steering spindle in a side view.

A telescopable steering spindle 1 is illustrated in FIG. 1 in a side view. The steering spindle 1 comprises an inner spindle 2 and an outer spindle 3. The inner spindle 2 is provided with an out-of-round cross section which in this example is roughly cloverleaf-shaped. The outer spindle 3 is tubular having an inner free cross section which is complementary to the outer circumferential contour of the inner steering spindle. The inner spindle 2 and the outer spindle 3 at the ends in each case hold connecting pieces 4, known per se, for cardan joints for connecting to a steering gear and a steering column. In the example, a universal joint is illustrated as the joint, in which the pins of a joint cross (=pin cross) are pivoted-mounted in the connecting pieces 4 which are formed as forks, wherein the bearings of the forks are orthogonally offset in relation to one another. However, it is conceivable and possible to connect other joints or completely different elements to the telescopable shaft parts, for example at one end directly a pinion for meshing with a steering gear.

Figure 2:
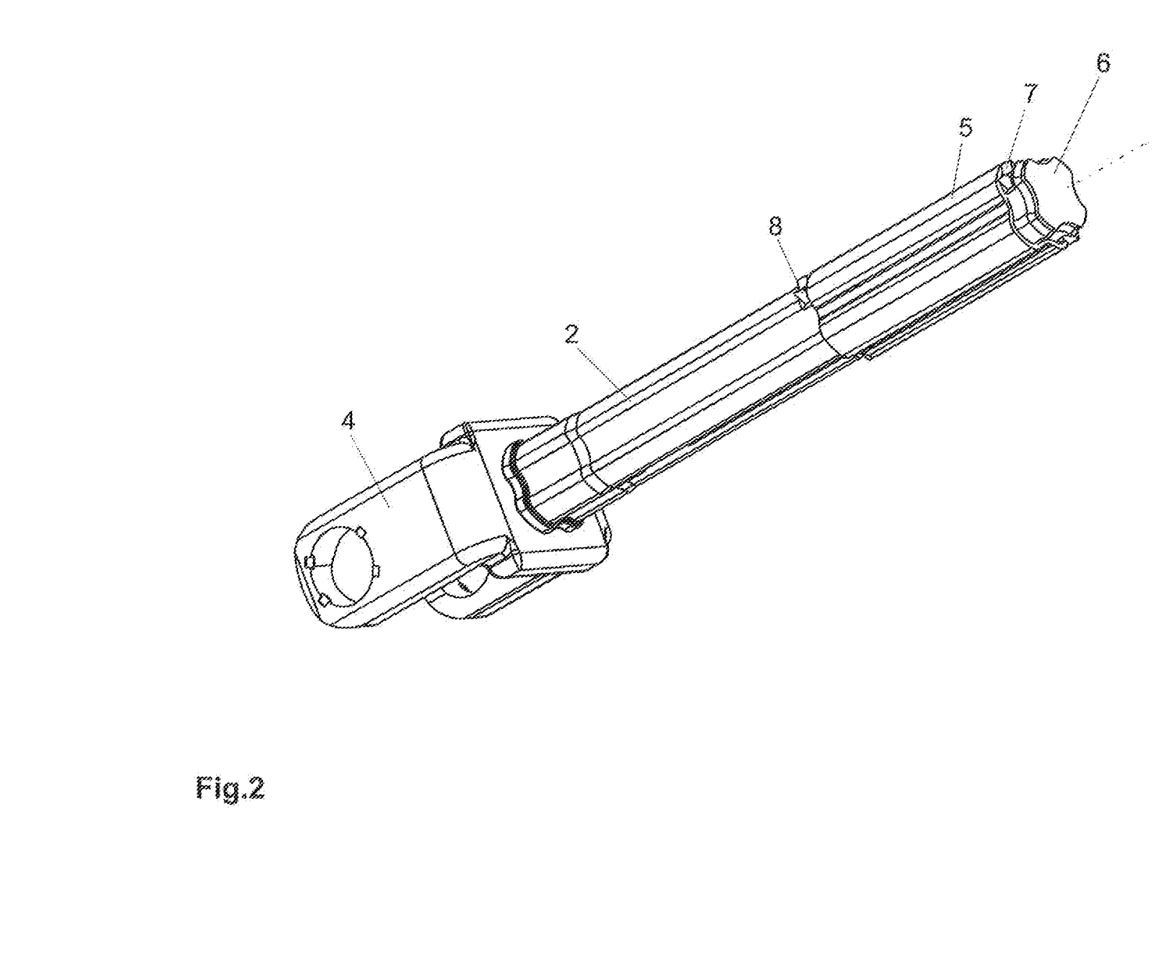
FIG. 2: shows the inner steering spindle with the sliding sleeve fitted in a perspective illustration.

FIG. 2 shows the inner steering spindle 2 in a perspective illustration. Here, the steering spindle 2 carries a sliding sleeve 5 which close to a free end 6 of the inner spindle 2 is fitted onto the outer contour of the spindle 2 and is secured in the axial direction by snap-in lugs 7, 8.

Figure 3:
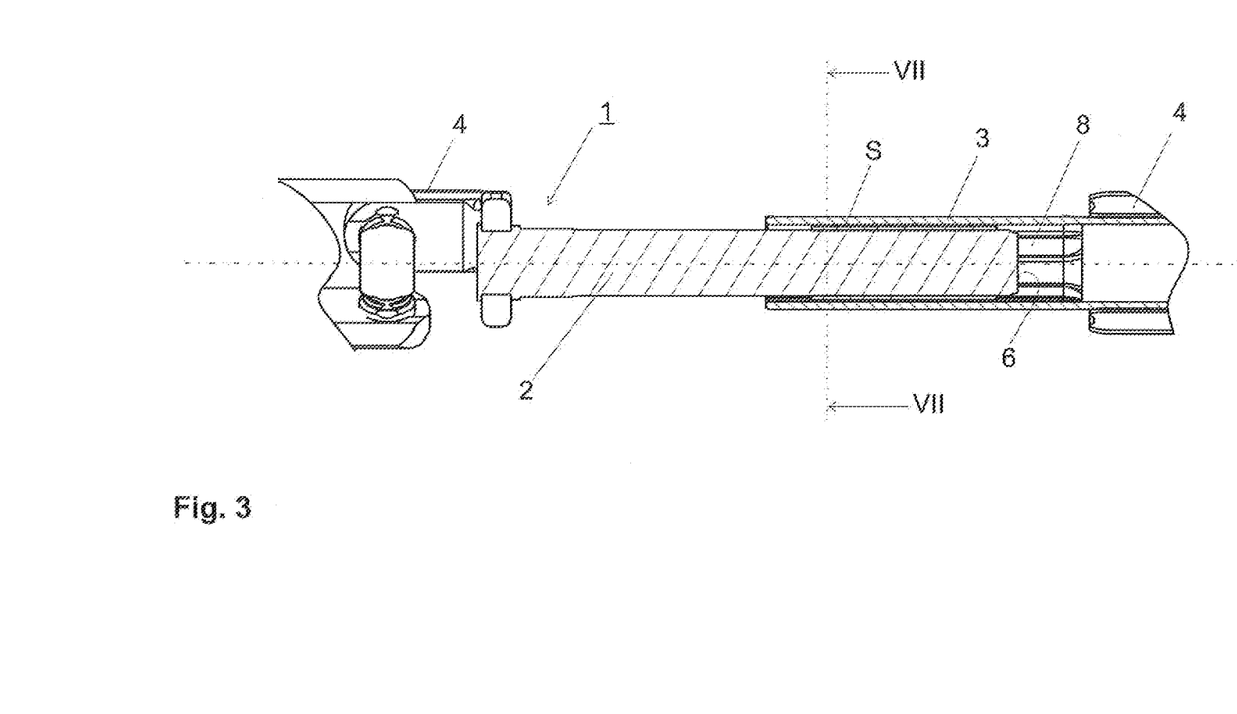
FIG. 3: shows the steering spindle according to FIG. 1 in a longitudinal section from the side.

FIG. 3 shows the steering spindle 1 from FIG. 1 in a longitudinal section. The inner spindle 2 is manufactured from solid material. It engages with the inner contour of the outer spindle 3 over approximately ¾ of the length of an inner free space 8. The sliding sleeve 5 is approximately centrally arranged in the covering area between the inner spindle 2 and the outer spindle 3. The free end 6 of the inner steering spindle 2 is located at a distance from the end of the free space 9.

Figure 4:
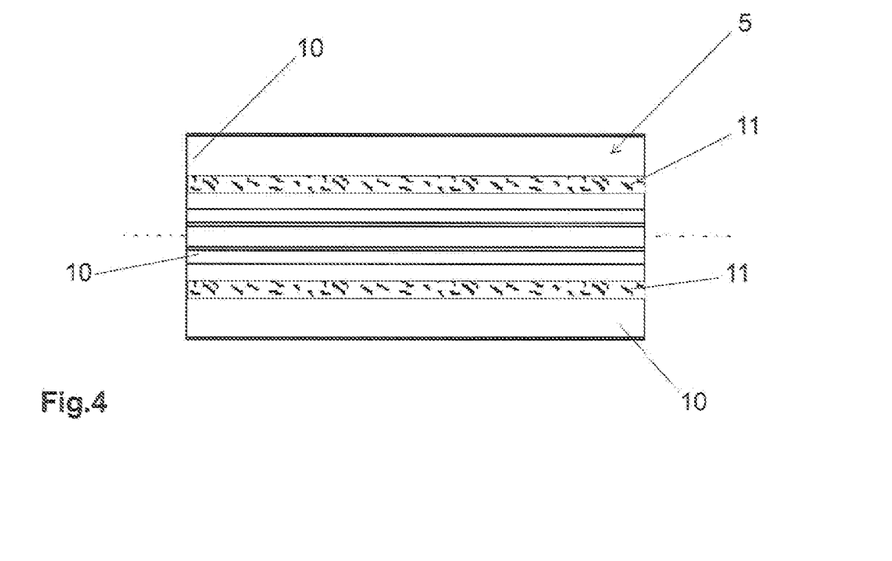
FIG. 4: shows a sliding sleeve according to the invention in a side view.
Figure 5:
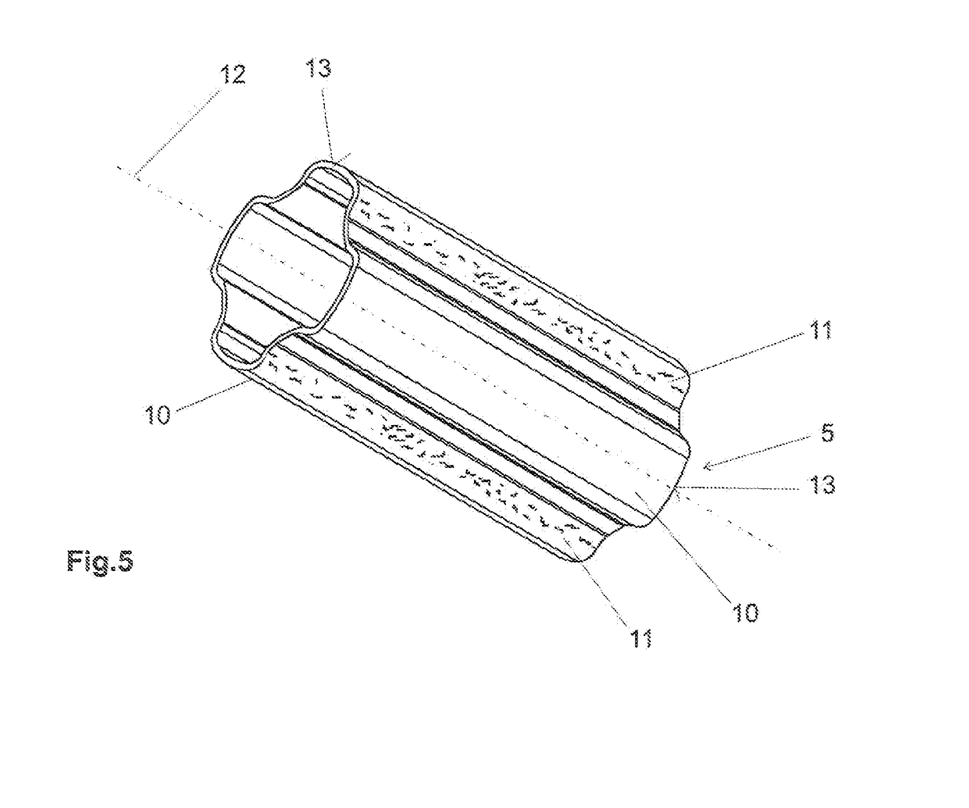
FIG. 5: shows the sliding sleeve according to FIG. 4 in a perspective illustration.

FIG. 4 shows the sliding sleeve 5 in a side view. The sliding sleeve 5 on its outside has smooth surface areas 10 and structured surface areas 11 situated between them. The geometrical design of the sliding sleeve 5 can be identified better in FIG. 5 in a perspective illustration. The sliding sleeve 5 has a cross section which approximately corresponds to the cloverleaf shape of the inner spindle 2 and the outer spindle 3. The sliding sleeve 5 is designed as a component with a uniform cross section and two parallel end faces 13 aligned perpendicular to the centre axis 12. The sliding sleeve 5 can, for example, be manufactured by extrusion from a thermoplastic material.

With extrusion, just as with injection moulding, plastic material is pressed with increased temperature above a softening point in or through a mould. A smooth layer or "skin", corresponding to the inner surface of the mould used, forms in the contact area between the plastic material and the mould. This smooth layer, which characterises the areas 10 and also the inner surface of the sliding sleeve 5 from FIGS. 4 and 5, does not have a structure which would be suitable for retaining lubricant in a way which is durable. The state existing directly after manufacture, which is used in the devices according to the prior art, is, therefore, not suitable for preventing the stick-slip effect in a way which is durable.

In order to guarantee a reduction in stiction and sliding friction in the configuration illustrated in FIG. 3, in which the sliding sleeve 5 moves with the inner spindle 2 when telescoping and is displaced with respect to the outer spindle 3, the structured areas 11 are provided on the outer surface of the sliding sleeve 5.

The structured areas 11 can be roughened in a suitable way. This roughening preferably involves indentations or recesses which breach the smooth surface resulting from the manufacturing process and form the pockets which are capable of retaining lubricant.

Figure 6:
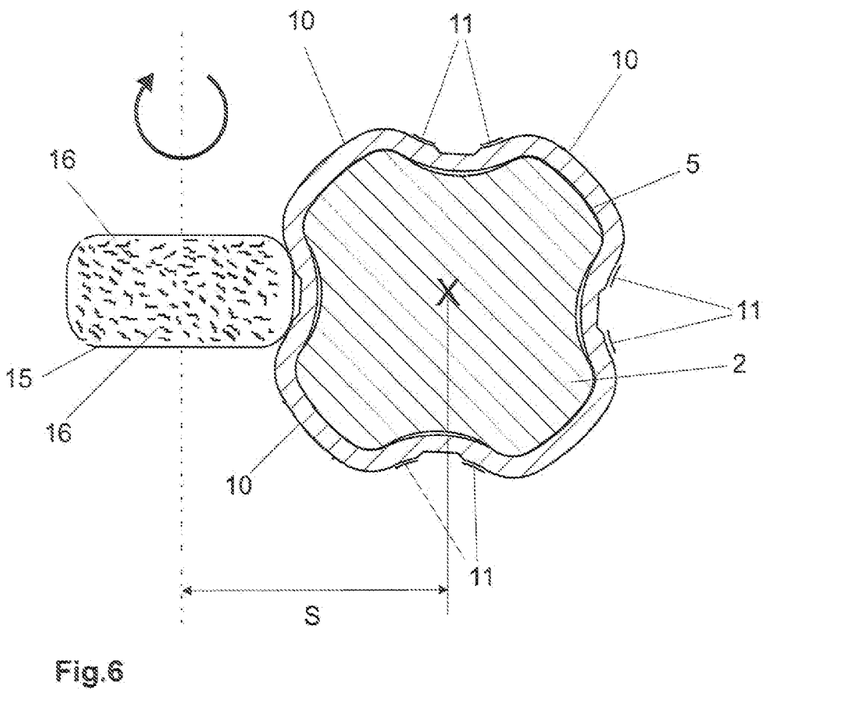
FIG. 6: shows a schematic illustration for manufacturing a sliding sleeve according to the invention with an inner steering spindle in a cross section.

An example for the manufacture of a sleeve 5 is illustrated in FIG. 6. FIG. 6 shows a cross section through an inner steering spindle 2 and a sliding sleeve 5. The sliding sleeve 5 is pushed by a roller 15 into the areas of the inner steering spindle 2 which have a smaller radius from the centre axis. The roller 15 at the same time has a plurality of protrusions or spikes 16 which penetrate the surface of the sliding sleeve 5 during the rolling operation which takes place parallel to the axial direction. The smooth surface structure is thereby breached and altered. The recesses or indentations required to retain the lubricant are formed. The surface areas of the sliding sleeve 5, which are located outside the area of contact with the roller 5, remain smooth and form the smooth surface areas 10 already described.

As tests have revealed, when the sleeve is formed from long-chain polymers it Suffices to just break up the long chains, in order to obtain a good uptake of lubricant. By breaking up the longer chains, corresponding wrinkling forms, as it were, in the surface, which is suitable for use as lubricant pockets. Often, only slight changes in the surface are enough to improve the sustained lubrication of the close sliding fit. At the same time, the effect of the increase in the area of contact achieved by calibration also plays a role. Surprisingly, it is therefore also possible to obtain the required surface structure by means of a smooth roller, the Ra value of which is less than 1 in the area of contact with the sliding sleeve 5. The use of smooth rollers of this kind is, however, to be understood as an embodiment which is not necessarily to be preferred, even if it can in many cases result in the formation of a surface structure which retains lubricant.

The structuring of the roller, which is used for producing the sliding sleeve, is preferably formed in particular irregularly and divided into small sections. It can, for example, be formed by particles of hard metal or ceramic applied to the surface of the roller, wherein the average particle diameter should be less than 500 μm. An average particle diameter of less than 100 μm is particularly preferred. A roller equipped in such a way produces the desired surface structure when the surface is rolled by breaching the casting skin formed from long-chain polymers. The very fine and irregular indentations which thereby form retain the lubricant particularly well. It is not necessary to put large quantities of lubricant in special lubricant repositories, instead it is sufficient to provide the surface created in this way with a thin lubricant film, by spraying or by other application means, which then settles down in the surface structures. There is no risk of the lubricant retained in this way escaping when the motor vehicle is in operation.

At the same time as the surface structure is created, the sliding sleeve can also be calibrated to the outer of the inner spindle 2. Advantageously, a second rolling operation is carried out with a "smooth" roller after the rolling operation with a structured roller. In the process, in addition to forming a surface structure in a pre-defined area 11, the sliding sleeve 5 is calibrated to the inner spindle 2 and hence the area of contact between sliding sleeve 5 and inner spindle 2 is increased.

Rollers with roughnesses (the Ra and Rz values correspond to DIN EN ISO 4288 (1998-04) or to the Mechanical and Metal Trades Handbook from VERLAG EUROPA LEHR-MITTEL, Haan-Gruiten, 43$^{rd}$ Edition 2005, page 99) having Ra values in the range from 5-30 and having Rz values in the range from 5-50 have proven to be particularly advantageous in tests for introducing the structure. The sleeve then has Ra values in the range from 1-30. However, as already explained above, rollers with roughnesses of Ra <5 can, definitely be used successfully. The selection depends on the lubricant used and the plastic material.

Preferably, the telescopable steering spindle is produced with the following method steps:
  sliding a sliding sleeve, which has a non-round cross-section contour, preferably a cloverleaf-like cross-section contour, onto the inner spindle 2;
  rolling the outwardly directed surface of the sliding sleeve 5 in at least pre-defined areas with a pre-defined feed force and/or a pre-defined feed travel, wherein the inner spindle 2 serves as a support for the rolling operation;
  applying lubricant to at least sections of the outwardly directed surface of the sliding sleeve 5;
  sliding the outer spindle 3 onto the sliding sleeve 5 with the inner spindle 2 enclosed by the sliding sleeve.

Preferably, the rolling operation takes place in all contact areas which are formed between the outwardly directed surface of the sliding sleeve 5 and the inwardly directed surface of the outer steering spindle after assembly. In the process, it is conceivable and possible for the surface areas to be subjected to the rolling operation individually in sequence or preferably in each case for opposing areas or more preferably for all areas at the same time to be subjected to the rolling operation. If all areas are subjected to the rolling operation at the same time, then the method is particularly cost-effective and can best fulfil the additionally desired calibration function for adapting the sliding sleeve to the inner spindle.

Owing to the slight deviation in shape of the cross-sectional shapes between the inner and outer contour of the sliding sleeve 5 and the assigned surfaces of the outer and inner spindles, a spring effect is formed which can compensate small degrees of circumferential backlash.

Figure 7:
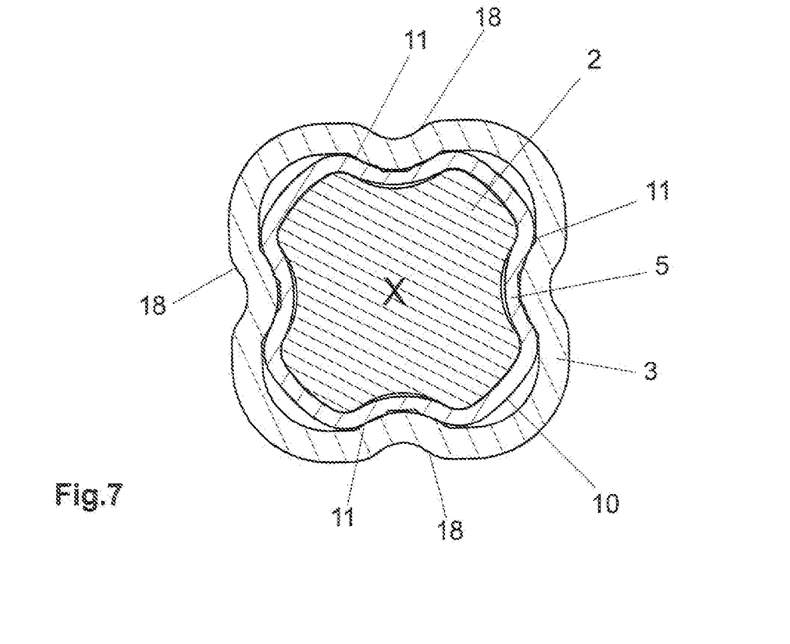
FIG. 7: shows a steering spindle in a cross section through the outer steering spindle, the sliding sleeve and the inner steering spindle.

Finally, FIG. 7 shows a cross section through the steering spindle from FIG. 1 and FIG. 3 along a line VII-VII from FIG. 3. The outer spindle 3 is arranged coaxially in relation to the inner spindle 2 and the sliding sleeve 5. In particular profile areas 18, the outer spindle 3 has a shape which is complementary to the inner spindle 2. In the assembled state, the areas which in operation transmit a torque are in contact with the structured areas 11 of the sliding sleeve 5. In the remaining areas, preferably no or only one minor contact is provided between the outer spindle 3 and the sliding sleeve 5. Here, structuring of the sliding sleeve 5 is possible but not necessary.

In a continuation of the invention, the special profile area 18 can only be calibrated during assembly, for example by pressing-in, so that the exact shape and contact are established.

In subsequent operation, it is possible, on the one hand, to attach the steering spindle 1 with the connecting pieces 4 for the cardan joints to a steering column in a torque-proof manner and, on the other hand, to connect the steering spindle 1 to the input shaft of a steering gear. Vehicle body movements then lead to an axial movement of the cardan joints towards one another or away from one another, so that a telescoping movement of the inner spindle 2 with respect to the outer spindle 3 is required. The sliding sleeve 5 is fixed essentially immovably with respect to the inner spindle 2. Thus, it also carries out a telescoping movement with respect to the outer spindle 3. The structured areas 11 are thereby brought into close contact with the inner surface of the outer spindle 3. The recesses or indentations located in the structured areas 11 or the subsequently introduced surface roughness present there, retain a lubricant applied there, preferably in pockets of some kind which circumferentially are closed on all sides. In this way, the structured areas 11 can be durably lubricated with respect to the outer spindle 3, which reduces or completely eliminates the unfavourable stick-slip effect by decreasing stiction in the contact area. The relatively large surfaces of the structured areas 11 ensure a durable freedom from backlash when applying torque required in operation. The design is chosen so that the sliding sleeve 5 endures the forces and moments impacting in operation for the duration of its service life.

The invention also comprises the reverse case, in which the sliding sleeve is roughened at areas which are located on its inner surface. The sliding sleeve is correspondingly inserted onto the outer spindle 3 and then subjected to the rolling operation. Roughening thereby occurs in a pre-defined area 11 and calibration of the sliding sleeve 5 to the inner contour of the outer spindle 3. The sliding sleeve is advantageously axially fixed against movement with respect to the outer spindle, while the axial movement between sliding sleeve 5 and inner spindle 2 is permitted.

With regard to the invention, it is not necessary to fix the sleeve in the direction of movement (=telescoping direction) with respect to one of the two shafts, even if this is preferable.

List of Reference Numbers

1. Steering spindle
2. Inner spindle
3. Outer spindle
4. Connecting piece for cardan joint
5. Sliding sleeve
6. Free end
7. Snap-in lug
8. Snap-in lug
9. Inner free space
10. Smooth surface area
11. Structured surface area
12. Centre axis
13. End faces
15. Roller
16. Spikes
18. Profile area

The invention claimed is:

1. A telescopable steering spindle, comprising:
an inner steering spindle of the teloscopable steering spindle;
an outer steering spindle of the telescopable steering spindle, wherein the inner steering spindle and an outer steering spindle are arranged coaxially in relation to one another and have an out-of-round cross section for torque transmission, wherein an intermediate space is provided between the outer steering spindle and the inner steering spindle; and
a sliding sleeve of the telescopable steering spindle arranged in the intermediate space, wherein the sliding sleeve comprises long-chain polymers and includes a surface structuring on at least one surface facing the inner spindle or the outer spindle, the surface structuring comprising broken-up chains of the long-chain polymers, wherein structured surface areas of the sliding sleeve are provided with indentations or recesses on a microscopic level, and are for lubricant retention
wherein the sliding sleeve is calibrated to a profile of the inner steering spindle, and
wherein the indentations or recesses are a result of the calibration to the profile of the inner steering spindle.

2. The telescopable steering spindle according to claim 1, wherein indentations or recesses comprise rolled indentations or recess.

* * * * *